July 15, 1924.
C. E. HUGHES
LIGHT DEFLECTOR FOR HEADLIGHTS
Filed May 25, 1922
1,501,779
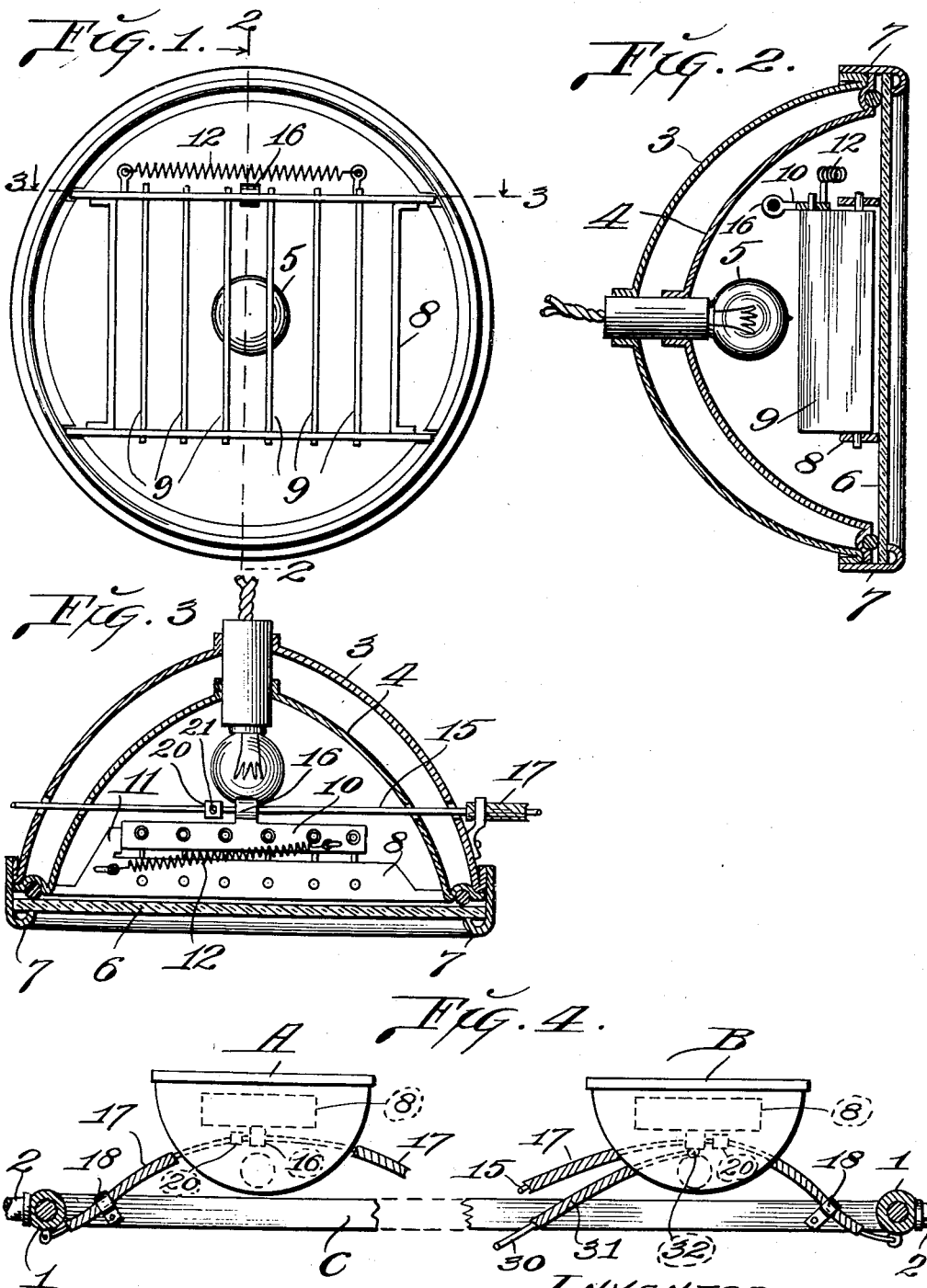

Patented July 15, 1924.

1,501,779

UNITED STATES PATENT OFFICE.

CORA ELIZABETH HUGHES, OF LOS ANGELES, CALIFORNIA, ASSIGNOR OF ONE-THIRD TO THOMAS M. INGMAN AND ONE-THIRD TO LLOYD L. ELLIOTT, BOTH OF LOS ANGELES, CALIFORNIA.

LIGHT DEFLECTOR FOR HEADLIGHTS.

Application filed May 25, 1922. Serial No. 563,642.

*To all whom it may concern:*

Be it known that I, CORA ELIZABETH HUGHES, a citizen of the United States, residing at Los Angeles, in the county of Los Angeles and State of California, have invented new and useful Improvements in Light Deflectors for Headlights, of which the following is a specification.

This invention is a light deflector particularly adapted to be employed in connection with the usual vehicle headlight and so constructed as to provide for either normal projection of the rays of light or lateral deflection of said rays beyond the side of the vehicle.

It is the object of the invention to provide a deflector which may be mounted upon a standard headlight and which will normally permit the projection of the rays of light in usual manner, but which will provide for lateral deflection of the rays of light when the machine is turned to one side or the other, the construction being such that only the light from the headlight at the side of the car in the direction in which a turn is made will be thus laterally deflected.

The invention will be readily understood from the following description of the accompanying drawings, in which:

Figure 1 is a front elevation of a headlight having the improved deflector mounted thereon;

Figure 2 is a vertical section on the line 2—2 of Figure 1;

Figure 3 is a horizontal section on the line 3—3 of Figure 1;

Figure 4 is a plan view, showing the front axle of a vehicle and a pair of headlights for the vehicle, said headlights being provided with the improved deflecting means.

The headlights of a vehicle are shown at A and B and the front axle is shown at C and is provided with usual steering knuckles 1 carrying the stub shafts 2 upon which the wheels are mounted.

The headlights may be of the usual construction, comprising an outer casing 3, reflector 4, a source of light 5, a front glass 6 and a usual retaining ring 7.

The deflector is mounted in the headlight in front of the lamp 5 and preferably comprises a frame 8 extending across the front of the headlight and supported upon the casing 3, with the glass 6 and retaining ring 7 holding said frame in position. A plurality of fins or shutters 9 are pivotally mounted in the frame 8 and are connected at their upper ends by a cross plate 10 so that the shutters will be dependently shifted. A stop 11 upon the frame is adapted to be impinged by the plate 10 when the shutters are in a position edgewise to the rays of light coming from the reflector of the headlight. A spring 12 connected at its respective ends to the frame 8 and to the plate 10 is adapted to yieldably urge the shutters to a position whereby the plate 10 abuts against the stop 11.

The shutters are adapted to be swung upon their pivots in the opposite direction so that the rays of light from the headlight will strike against one side of the angularly disposed shutters. The side of the shutters against which the light will strike is highly polished so as to form a reflecting surface and the angular disposition of the reflecting surface will cause a lateral deflection of the light from the headlight.

In practice, the two headlights of a machine are so constructed that when the shutters are shifted for deflection of the light, the light from the right hand headlight will be deflected laterally beyond the right hand side of the machine, while the light from the left hand headlight will be deflected laterally beyond the left hand side of the machine.

An operating connection is provided for the radial deflectors so that when turning to the right the deflector of the right hand headlight will be shifted, while the deflector of the left hand headlight is shifted when a turn to the left is made. As an instance of this arrangement, a flexible cable 15 extends transversely of the vehicle and through the respective headlights. This cable is received through eyes 16 upon plates 10 and the ends of the cable are connected to the steering knuckles at the front axle of the car. The flexible cable is preferably encased within a flexible sheathing 17 and clamping brackets 18 attached to the axle support the flexible operating connection.

Abutment members 20 are adjustably fixed upon cables 15 as by set screws 21, and these abutment members are arranged adjacent the respective eyes 16 so that lateral movement of the flexible cable will cause one or the other of the abutment members to engage the adjacent eye for shifting the shutters of the reflector.

It will be understood that the turning of the steering knuckles in steering the vehicle will thus shift the flexible cable in opposite directions so as to move one or the other of the deflectors, while allowing the opposite deflector to remain in its normal position. It will also be noted that the construction as thus described provides for operation of the deflector of the right hand headlight when turning to the right and operation of the deflector of the left hand headlight when turning to the left. As a consequence, movement of the steering mechanism will cause lateral deflection of the light from one headlight in order to illuminate the road in the direction of turn, while the rays of light from the other headlight will be projected in normal manner.

The invention may also include means for continually illuminating the side of the road irrespective of operation of the steering mechanism, as will be found desirable when driving in fog or the like. For this purpose a flexible cable 30 received within a flexible sheathing 31 may be connected to the plate 10 of the deflector for the right hand headlight as shown at 31. This cable may lead to a suitable point convenient to the driver of the car, preferably the steering wheel, so that a pull upon the cable will swing the deflector in order to laterally deflect rays from the headlight, and thereby illuminate the side of the road. The deflector may be held in this shifted position by any suitable locking means (not shown) provided for cable 30 and arranged convenient to the driver.

It will be apparent that various changes may be made in the construction as thus described without departing from the spirit of the invention.

What is claimed is:

1. The combination with a vehicle axle having stub shafts pivoted thereto, of a headlight having a plurality of reflectors transversely spaced across the front of said headlight upon vertical pivots, an operating member connected to said stub shafts so as to be shifted in opposite directions by turning movement of said stub shafts in opposite directions, a lug on said operating member, means for turning said reflectors having an abutment element adapted to be engaged by said lug upon shifting of said operating member in one direction for turning said reflectors so as to laterally deflect transversely spaced portions of the rays of light from said headlight, said lug being adapted to disengage said abutment element during shifting of said operating member in the opposite direction, and a spring for actuating said reflector turning means so as to turn said reflectors edgewise to the rays of light from said headlight when said lug is disengaged from said abutment element.

2. The combination with a vehicle axle having stub shafts pivoted thereto, of headlights at the respective sides of the vehicle, a plurality of reflectors for each of said headlights transversely spaced across the fronts thereof upon vertical pivots, an operating member connected to said stub shafts so as to be shifted in opposite directions by turning movement of said stub shafts in opposite directions, lugs on said operating member, means for turning the reflectors of the respective headlights having abutment elements adapted to be engaged by the respective lugs upon shifting of said operating member in opposite directions for turning the reflectors of the respective headlights so as to laterally deflect transversely spaced rays of light, said lugs being adapted to disengage said abutment elements during opposite shifting of said operating member, and springs for actuating the reflector turning means for the respective headlights so as to turn said reflectors edgewise to the rays of light when said lugs are disengaged from said abutment elements.

In testimony whereof, I have signed my name to this specification.

CORA ELIZABETH HUGHES.